United States Patent [19]
Cochran

[11] Patent Number: 5,725,337
[45] Date of Patent: Mar. 10, 1998

[54] SELF CENTERING SPADE DRILL

[76] Inventor: Donald Paul Cochran, 11821 Hubbard St., Moreno Valley, Calif. 92557

[21] Appl. No.: 490,902

[22] Filed: Jun. 16, 1995

[51] Int. Cl.$^6$ ............................................. B23B 51/02
[52] U.S. Cl. ................................ 408/224; 408/227
[58] Field of Search ............................ 408/227, 229, 408/226, 231, 233, 713, 199, 224

[56] References Cited

U.S. PATENT DOCUMENTS

| | | | |
|---|---|---|---|
| 1,230,569 | 6/1917 | Dixon | 408/229 |
| 2,237,901 | 4/1941 | Chun | 408/227 |
| 2,739,496 | 3/1956 | Fleischer | 408/233 |
| 3,169,417 | 2/1965 | Andreasson, Jr. | 408/226 |
| 3,320,833 | 5/1967 | Andreasson | 408/226 |
| 5,302,059 | 4/1994 | Fabiano | 408/227 |
| 5,401,126 | 3/1995 | Norris et al. | 408/227 |

FOREIGN PATENT DOCUMENTS 574599   7/1924   France ............................ 408/226

OTHER PUBLICATIONS

Parts Order List for Washington Spade Drills & Holders (2 pages).
Advertisements for Sandvik's Delta Drill (4 pages)
Parts Order List for Coromant Delta Drills (2 pages).

*Primary Examiner*—Daniel W. Howell

[57] ABSTRACT

An improved self centering spade drill having at least three cutting blades extending radially outward from the center of the drill, the front edge of the blade constituting the cutting portion of the drill, the rear edge of the blade constituting the port end of the drill which are adapted to be received and supported by a drill holder.

3 Claims, 4 Drawing Sheets

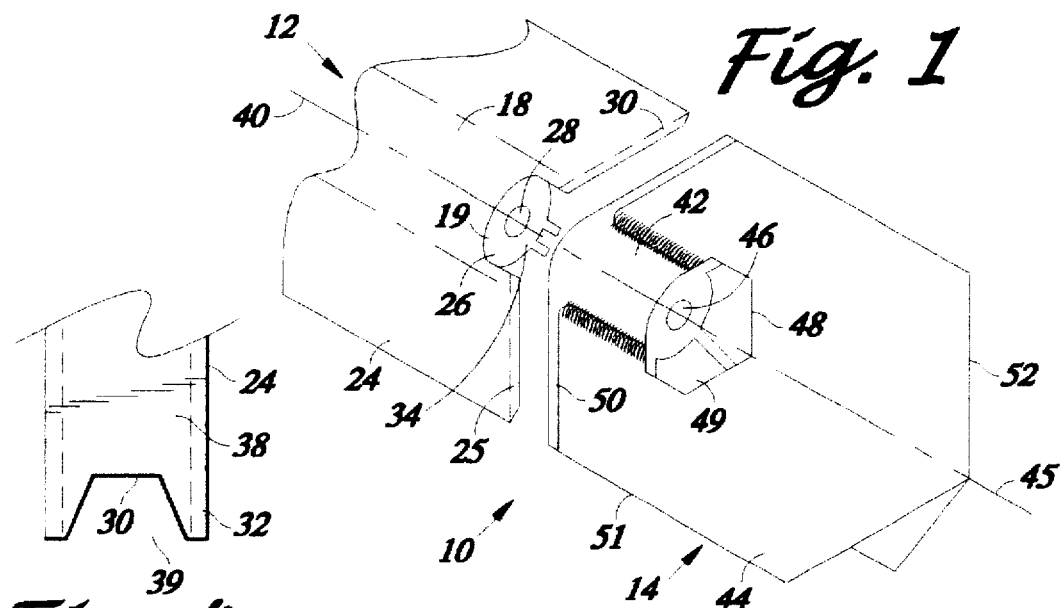
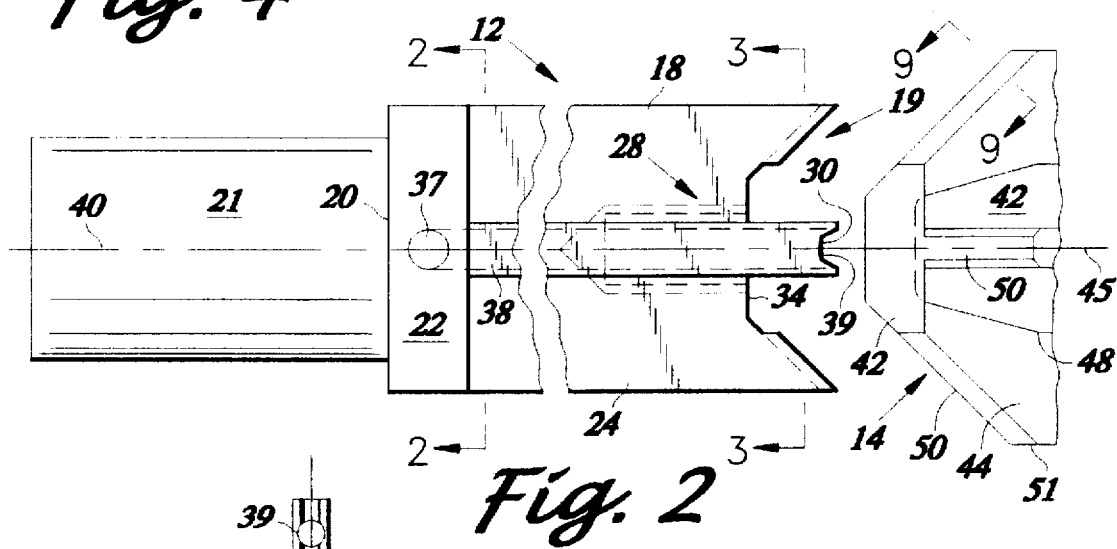
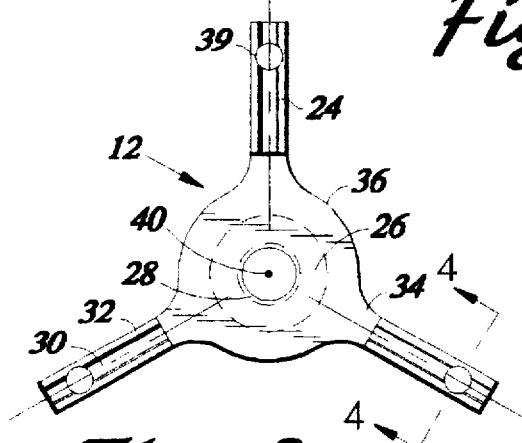
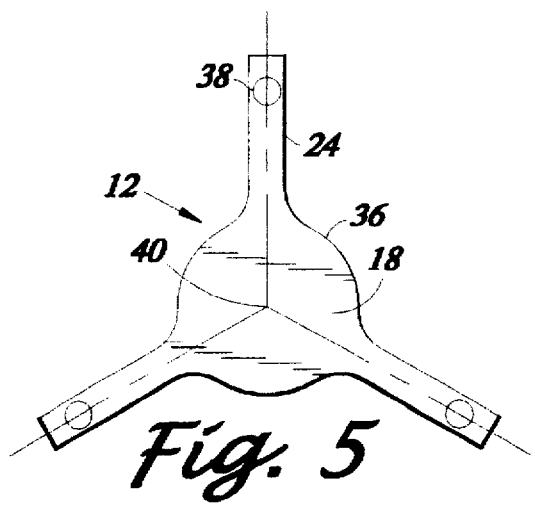

5,725,337

SELF CENTERING SPADE DRILL

FIELD OF INVENTION

The invention is directed to an improved self centering spade drill, a drill holder for the self centering spade drill, an adaptor for securing the self centering spade drill to a conventional spade drill blade holder, and a carbide insert holding improved self centering spade drill that can be held in the standard spade drill holder.

BACKGROUND OF THE INVENTION

Spade drills have become increasingly popular because of the ability to replace the spade drill blades when they become dull rather than the entire blade and holder as is required with conventional twist drills. Spade drills have a major disadvantage; they are difficult to center when initially entering the work piece and they can vibrate or shake in the work piece because of voids, uneven hardness, or deflection from pressure of the work piece material causing the cut or bore to drift. Because of this, spade drills are not the drill of choice for high tolerance work. This is unfortunate because spade drills cut fast and are inexpensive compared to twist drills in larger sizes.

It is an object of the present invention to provide a self centering spade drill which needs no center drill hole to align the drill.

A further object of this invention is to provide an improved spade drill which is tighter, more stable, and more precise than conventional spade drills.

A further object of the present invention is to provide an improved spade drill which has more cutting surfaces and thus can provide for faster cutting into the work piece and easier drilling with less pressure and less heat production.

It is a further object of the present invention to provide a drill holder for the improved self centering spade drill which will securely and tightly hold the drill in place and which permits the drill to be fit on conventional drilling machines and computer numerical control (CNC) machining centers.

A further object of the present invention is to provide an adaptor for securing the improved self centering spade drill onto a conventional holder for spade drill blades.

SUMMARY OF THE INVENTION

The present invention is directed to an improved self centering spade drill comprising a base centered on the drill's longitudinal axis, at least three radially extending cutting plates, the front end of the plates constituting the cutting end of the drill, the back end of the plates constituting the support end of the drill, the outer portion of the back edge of each plate angled radially inwardly to the outer circumference of the base, the inner portion of the back edge of each plate is secured to the base, the outer portion of the back edge of each plate is tapered to a blunt wedge, the base and the outer portion of the back edge of each plate adapted to be received and secured by the drill holder.

The drill holder of the present invention is a drill holder for an improved self centering spade drill comprising a shank adapted to be received and secured by commercial drill holders, a base element coaxial with the drill holder's longitudinal axis and secured to one end of the shank, at least three radially extending support plates, the back end of the plates secured to the base element, the front edge of the plates angled radially outward from a body, each plate being attached to the body, the front edge of each plate being grooved with inwardly tapered walls, the front face of the body and the front edge of each plate being adapted to receive and secure an improved self centering spade drill.

Another embodiment of the present invention is directed to a combination of the improved self centering spade drill and the drill holder for the spade drill which is adapted to be received by and secured by a conventional tool shank holders.

In a further embodiment of the present invention, the invention is directed to an adaptor for supporting an improved self centering spade drill in a conventional spade drill blade holder comprising a planer plate having a step indent on its back edge and a bore hole through the plate near the step indent for receiving a retaining bolt, the plate adapted to be received by and secured by a conventional spade drill blade holder, a self centering spade drill holder intregal with the planer plate and coaxial with the planer plates axis of rotation, the drill holder having body and a base element coaxial with the planer plates; axis of rotation and secured to the planer plate, at least three radially extending support plates, the back end of the plates secured to the base element, the front edge of the plate angled radially outward from the front face of the body, the inner edge of each plate being attached to a body, the front edge of each plate being grooved with inwardly tapered walls, the front face of the body and front edges of each plate being adapted to receive and secure an improved self centering spade drill.

Still another embodiment of the present invention is directed to an improved self centering spade drill which can be utilized in a conventional spade drill blade holder comprising the planer plate having a stepped indent on its back edge and a bore hole through the plate near the stepped indent for receiving a retaining bolt, the plate adapted to be received by and secured by a conventional spade drill blade holder, and a self centering spade drill intregal with the planer plate and coaxial with the planer plate's axis of rotation, the drill having at least three radially extending cutting blades, the front end of the blades constituting the cutting end of the drill, the inner portion of the back edge of each plate affixed to the planer plate.

In one embodiment of the present invention, the body for the drill holder is tapped and threaded to receive a threaded fitting such as a bolt or screw to secure the improved self centering spade drill to the drill holder. The improved self centering spade drill is secured by such fitting and, has a space behind its base to receive such fitting, and a coaxial bore to receive the fitting. The inner portions of the back edge of each plate has a cut out area to provide space for the fitting.

The cutting edge of the improved self centering spade drill can comprise cutting edges machined into the front edge of the plates or it can comprise hardened cutting inserts which are either permanently attached to the front edge of the plates or are removably attached to the front edge of the plates by providing pockets at the front edge of the plates which are adapted to receive pads having cutting inserts located in the forward edges of the pads.

In a preferred embodiment, each blade has an insert of cutting material and the insert for each blade is set off so that the insert(s) of one blade cuts the outer circumference of the cutting path of the drill, the insert of another blade cuts the inner circumference of the cutting path and the insert of the third blade cuts the middle portion between the outer circumference and inner circumference of the cutting path. In this way, smaller cutting blade inserts may be utilized and each blade does not have to be fitted with a cutting insert that covers the full radius or length of the front edge of each blade.

It is an object of the present invention to provide a self centering spade drill for use in machining hard materials, such as high alloy metals and ceramics.

It is a further object of the present invention to provide an improved spade drill which can be mounted on a drill holder which can be secured on conventional commercial holders which are presently used in the machining industry.

It is a further object of the present invention to provide a drill holder for the improved self centering spade drill which permits coolant to be supplied to the spade drill to cool the cutting edge of the drill during the cutting operation to enhance the speed of the drilling operation and life of the drill.

It is a further object of the present invention to provide an improved self centering spade drill which can be utilized without the need for a center drill.

An even further object of the present invention to provide an improved self centering spade drill which does not vibrate and flex to give a cutting operation which can hold much closer tolerances.

Another object of the present invention to provide an improved self centering spade drill which has additional cutting edges and can cut faster and more accurately than the conventional commercial spade drills presently available to the industry.

Still another object of the present invention is to provide improved self centering spade drill which can be mounted or secured to conventional commercial holders in their various designs.

BRIEF DESCRIPTION OF THE DRAWINGS

FIG. 1 is a perspective view of the combination of improved self centering spade drill and the drill holder for such drill;

FIG. 2 is a plan view of the drill holder of the present invention and a portion of the back end of the improved self centering spade drill of FIG. 1;

FIG. 3 is a cross sectional view of the drill holder taken along lines 3—3 of FIG. 2;

FIG. 4 is a partial cross sectional view along lines 4—4 of FIG. 3;

FIG. 5 is a cross sectional view of the drill holder taken along lines 5—5 of FIG. 2;

DETAILED DESCRIPTION OF THE INVENTION

Figure 6:
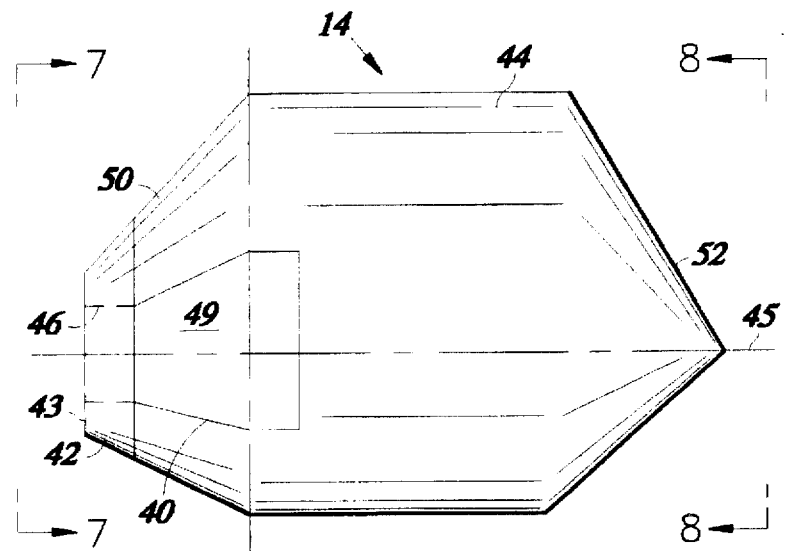
FIG. 6 is a plan view of the improved self centering spade drill of FIG. 1.
Figure 7:
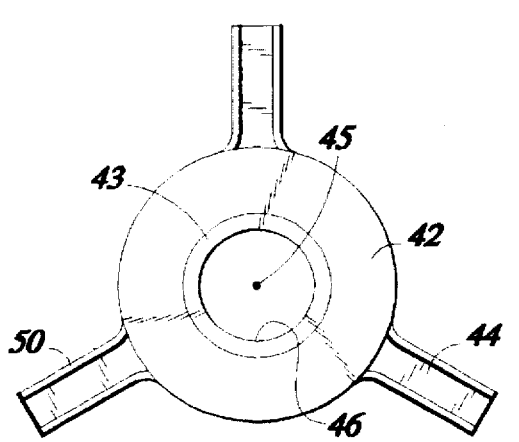
FIG. 7 is a back end view of the spade drill taken along lines 7—7 of FIG. 6.

Referring to FIG. 1, the drill and drill holder assembly 10 of the present invention comprises a drill bit holder 12 and a improved self centering drill bit 14. The drill holder has a body 18 having a drill receiving end 19 and a shank end 20 (see FIG. 2). The shank can be of any shape or size that fits conventional and commercially available tool holders. At least three wing plates 24 extend the length of the body. The inner edges of the wing plates are secured together as one piece with blended radii and fillets 36 to form the body 18 (FIGS. 5 and 3 respectively). The body has a front face 26 which has a threaded bore 28 adapted to receive a threaded fitting (not shown), such as a threaded bolt or screw for securing the drill bit 14 onto the drill holder. The forward edge 25 of the wing plates have radially grooves 30 walled with grooved tapered walls 32 (see FIGS. 3 and 4). The grooves extend from the outer edge 33 of the wing plates towards the inner edge of the wing plates to the front face of body to form a receiver space 34 to receive the back end of the improved self centering spade drill 14 which will be described below.

The improved self centering spade drill 14 shown in FIGS. 1, 2, 6, 7 and 8 has a base 42 at the back end of the drill and three blades 44 positioned approximately 120° from each other and extending radially outward from the longitudinal axis 45 of the drill. Coaxial with the longitudinal axis 45 and extending through the base 42 is bolt hole 46 adapted to receive a threaded fitting (not shown), such as a bolt or screw, which is adapted to engage the threaded bore 28 of the drill holder 12 described above to secure the drill to the holder. Each of the blades 44 have a cut out area 48 to provide a window 49 to install the threaded fitting (not shown) into the bolt hole (see FIG. 6). The outer portion of the back edge 50 of each blade 44 extends radially inward from the outer edge 51 of each blade to the base 42, and each back edge has tapered sides which are adapted to be received in the grooves 30 of the drill holder (see FIGS. 2, 6, 7 and 9). The forward edge 52 of the blades constitutes the cutting portion of the drill. The cutting blades can be machined cutting edges or can be cutting edges inserts that will be described below.

Referring to FIGS. 2, 3 and 5, the drill holder can optionally be fitted with coolant holes for supplying coolant to the improved self centering spade drill via the drill holder through coolant inlet 37 and coolant passages 38 which extend through the wing blades 24 to the coolant outlets 39 located in grooves 30. The outlets extend through the inner sides of the tapered walls 32 of the grooves 30 (see FIGS. 3 and 4). Optionally to reinforce the drill holder, the shoulder between adjoining blades are filled with fillet, integrally formed into the holder such as fillet 36 (see FIG. 5). The face 43 of the base 42 is adapted to engage and mate with the face 26 of body 18 of the holder.

Figure 8:
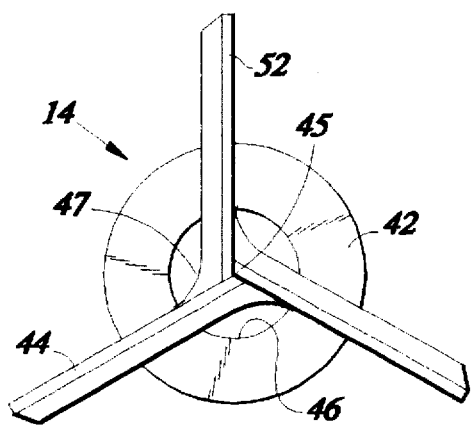
FIG. 8 is a front view of the spade drill taken along lines 8—8 of FIG. 6.
Figure 9:
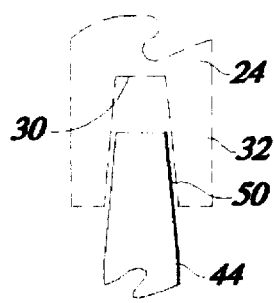
FIG. 9 is a cross sectional view of the back edge of the blades of the self centering spade drill taken along lines 9—9 of FIG. 2, the grooved front edge of the blade elements of the drill holder are shown in phantom.

Referring to FIGS. 6 and 8, the drill has cutting edges 52 for each blade 44. The cutting edges are machined into the blade in a conventional manner in the same way cutting edges are machined into steel cutting tools.

Figure 10:
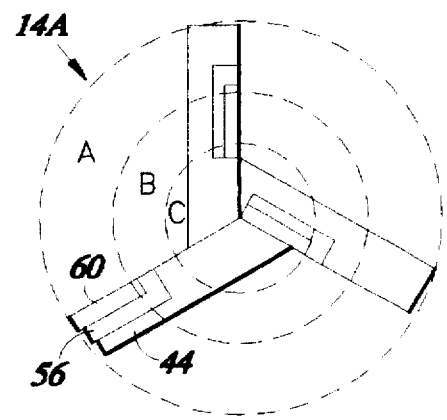
FIG. 10 is a front view of another embodiment of the self centering spade drill of the present invention.
Figure 11:
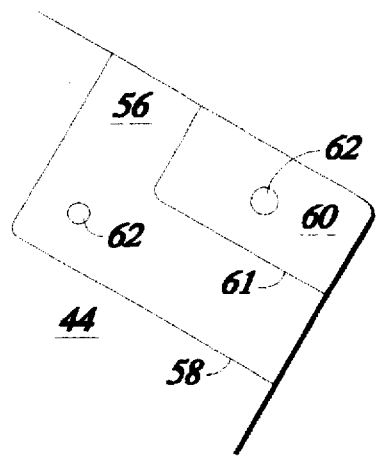
FIG. 11 is an enlarged plan view of the blade elements of the spade drill taken along lines 11—11 of FIG. 10.
Figure 11A:
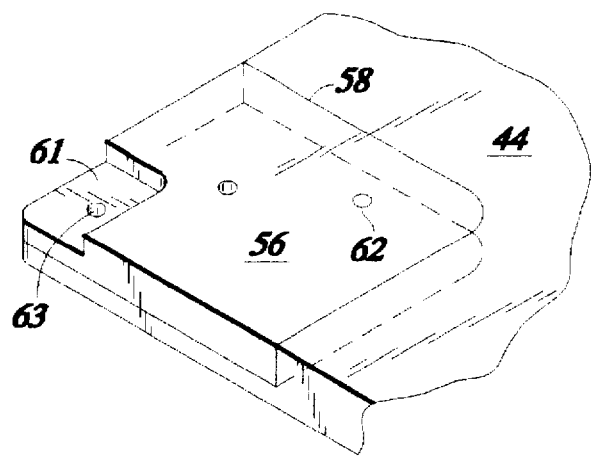
FIG. 11A is an enlarged prospective view of the blade elements of FIG. 11.
Figure 12:
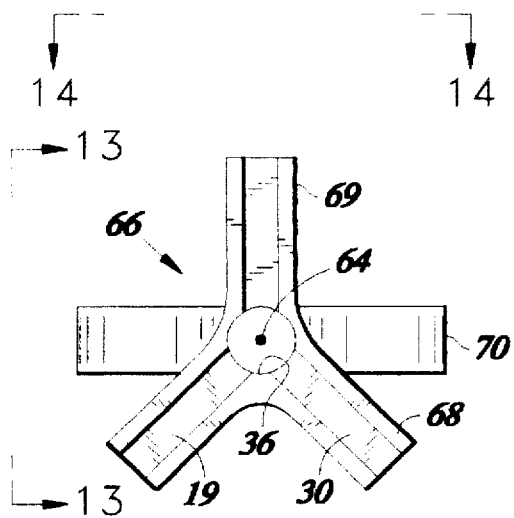
FIG. 12 is a front view of a drill holder of the present invention.
Figure 13:
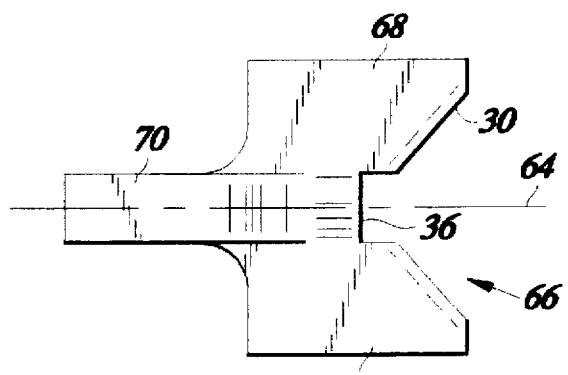
FIG. 13 is a side view of the drill holder adaptor taken along lines 13—13 of FIG. 12.
Figure 14:
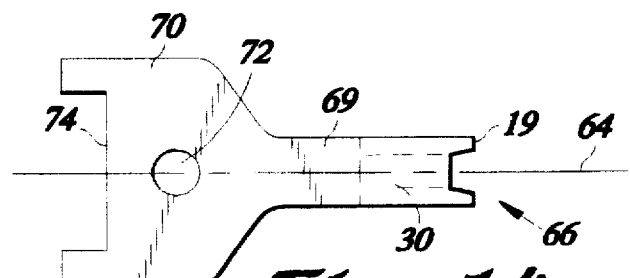
FIG. 14 is a top view of the drill holder adaptor taken along lines 14—14 of FIG. 12 (the lower blades are omitted for purposes of clarity)
Figure 15:
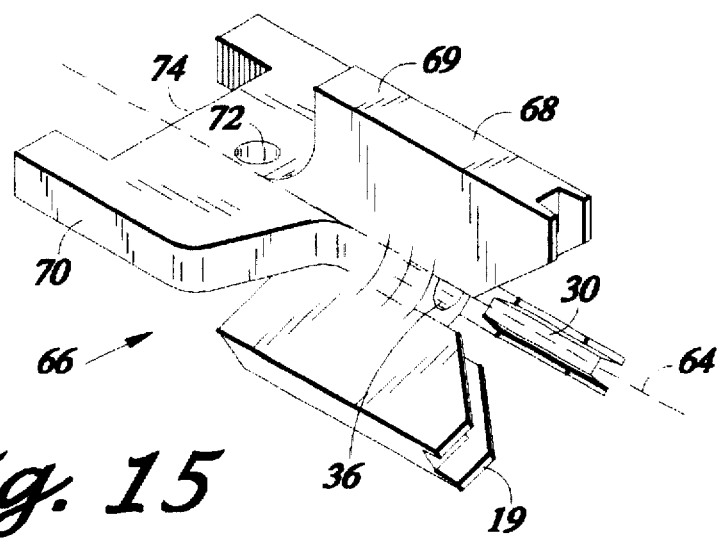
FIG. 15 is a perspective view of the drill holder adaptor of FIGS. 12–14.

An alternative embodiment of the present invention, as shown in FIGS. 10, 11 and 11A, the front edge 52 of the spade drill can have pre-formed cutting inserts affixed to the front edge. The cutting inserts can extend across the full length or radii of the front edge or can only cover a portion of the front edge as shown in FIG. 10. FIG. 10 has the blades. Each blade has its own separate cutting insert 60 mounted in a pocket at 61 on pad 56. The cutting insert is secured to the pad and to the blade by threaded screw 62. The pad 56 sits in pad pocket 58 in blade 44. The hardened cutting insert can be made of a carbide material, nitride material, or material embedded with diamond dust or diamond particles. The pad is normally made of similar material to prevent damage to the blade in the event that the cutting insert breaks or is fragmented during the cutting operation. The cutting inserts are arranged on each individual blade so that each blade cuts a different circular cutting path A, B or C respectively. However, cutting inserts which extend the full length of the front edge of the blades 33 can be used.

In the preferred embodiment, the cutting inserts will slightly overlap to ensure a smooth cut surface in the work piece. FIG. 11A is a perspective view of the blade 44 shown in FIG. 11.

An alternative embodiment 66 of the drill holder is illustrated in FIGS. 12 through 15. The drill holder is adapted to be received and secured by a conventional spade drill blade holder. The self centering spade drill adaptor has a universal spade drill blade holder or shank or planer plate 70 at its back end. The plate has a stepped indent 74 and a bore 72 for receiving a retaining bolt (not shown). The holder base 70 is intregal with the self centering spade drill holder 68 which comprises three wing blades 69. The three wing blade are arranged about 120° apart and are adapted to receive the rear edge of the cutting blades 44 of the self centering spade drill 14 described herein. The drill receiving end 19 of the adaptor has grooves 30 in the front edge of each blade 69. The front edge of each blade extends radially outwardly as the drill receiving end of the drill holder describe in FIGS. 1 and 2. At the center, coaxial with the axis of rotation 64 of the adaptor there is a threaded bore 36 to receive a threaded fixture (now shown) to secure the self centering spade drill into the adaptor as described herein. As stated above, this adaptor permits tri-bladed and other multi-bladed spade drills to be mounted on a conventional spade drill blade holder.

Figure 16:
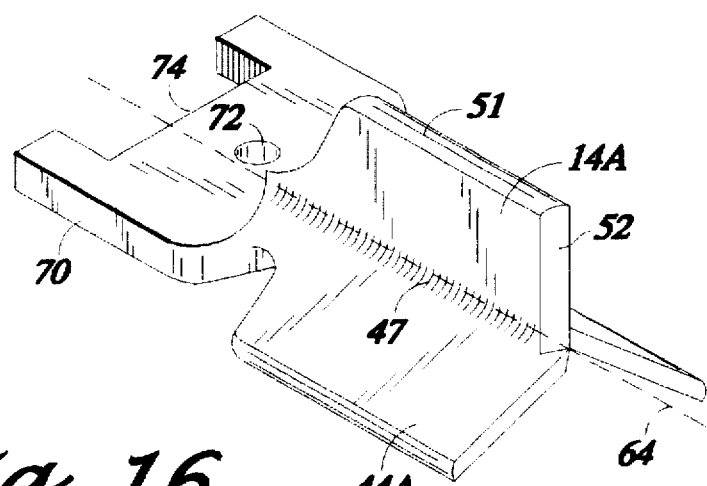
FIG. 16 is a perspective view of another embodiment of the self centering spade drill.

FIG. 16 shows an improved multibladed spade drill which can be mounted on a conventional planer spade drill blade holder. The base of the drill has a conventional planer spade drill blade shank 70 which has a stepped indent 74 and a retaining bore 72 to receive a threaded bolt to retain the drill in the holder. Intregal with the shank 70 is the spade drill 14A which has three cutting blades 44A arranged to extend radially outward from the center of the drill about its axis of rotation 64 at approximately 120° from each other. To reinforce the joinder of the three blades, the blades have fillets integrally formed into the drill bit, such as fillet 47, between the blades at their inner edges. The cutting edge of the blades 52, are similar to the cutting edges of the drill bit described in FIGS. 1, 6, 7 and 8. Alternatively, the blades can be fitted with cutting inserts in the same manner as described with respect to the self centering spade drill shown in FIGS. 10, 11 and 11A. The use of this spade drill eliminates the need for the adaptor described above in FIGS. 12–15. However, it is far more economical to manufacture a spade drill such as described with respect to FIGS. 1, 6–8 than to manufacture the spade drill described with respect to FIG. 16 since spade drill of FIG. 16 must be manufactured precisely with the shank 70. In contrast, the earlier described spade drill can be produced without any shank which eliminates the need to precisely fit or machine a shank onto the drill.

Obviously, the shank described with respect to FIG. 16 and with respect to the holder described in FIGS. 12–15 can also be fitted onto the holder described in FIGS. 1 through 5. In that case, the shank 21 on the holder 12 would be replaced with a shank similar to shank 70.

Other embodiments of the present invention not specifically described herein but which fall within the spirit and embodiment of the present invention are considered part of the invention herein. The drill and its companion holder if a holder is required can have more than three blades, is for example four or six blades.

What is claimed is:

1. An improved self-centering spade drill comprising a base having a front end and back end, the base coaxial with the longitudinal axis of the drill; at least three plates extending the length of the base and longitudinally beyond the front end of the base and extending radially the length of the base and longitudinally beyond the front end of the base and extending radially outward from the longitudinal axis, each plate having an inner edge, an outer edge, a front edge, and a rear edge, the front edge of the plates constituting the cutting end of the drill and the back edge of the plates constituting the attachment and support end of the drill, the fronts of the plates adjoined at the longitudinal axis of the drill, the back of the plates joined to the base, the front edge of each plate angled backward from the longitudinal axis to the outer edge of the plate, the front edges of the plates forming a drill point on the longitudinal axis, the outer portion of the back edge of each plate angled forward from the base to the outer edge of the plate, the back edge of each plate tapered to a blunt wedge adapted to be received in a drill holder, the back of the base and the back edge of each plate being adapted to be received by and secured by the drill holder.

2. The drill according to claim 1 wherein a cutting edge is attached to the front edge of each blade.

3. The drill according to claim 2 wherein a cutting edge of each blade of the drill cuts a different area than the cutting edges of its neighboring blades.

\* \* \* \* \*